Jan. 30, 1951  J. R. RITCHIE  2,539,635
LEAF BAGGING DEVICE
Filed May 3, 1944  3 Sheets-Sheet 1
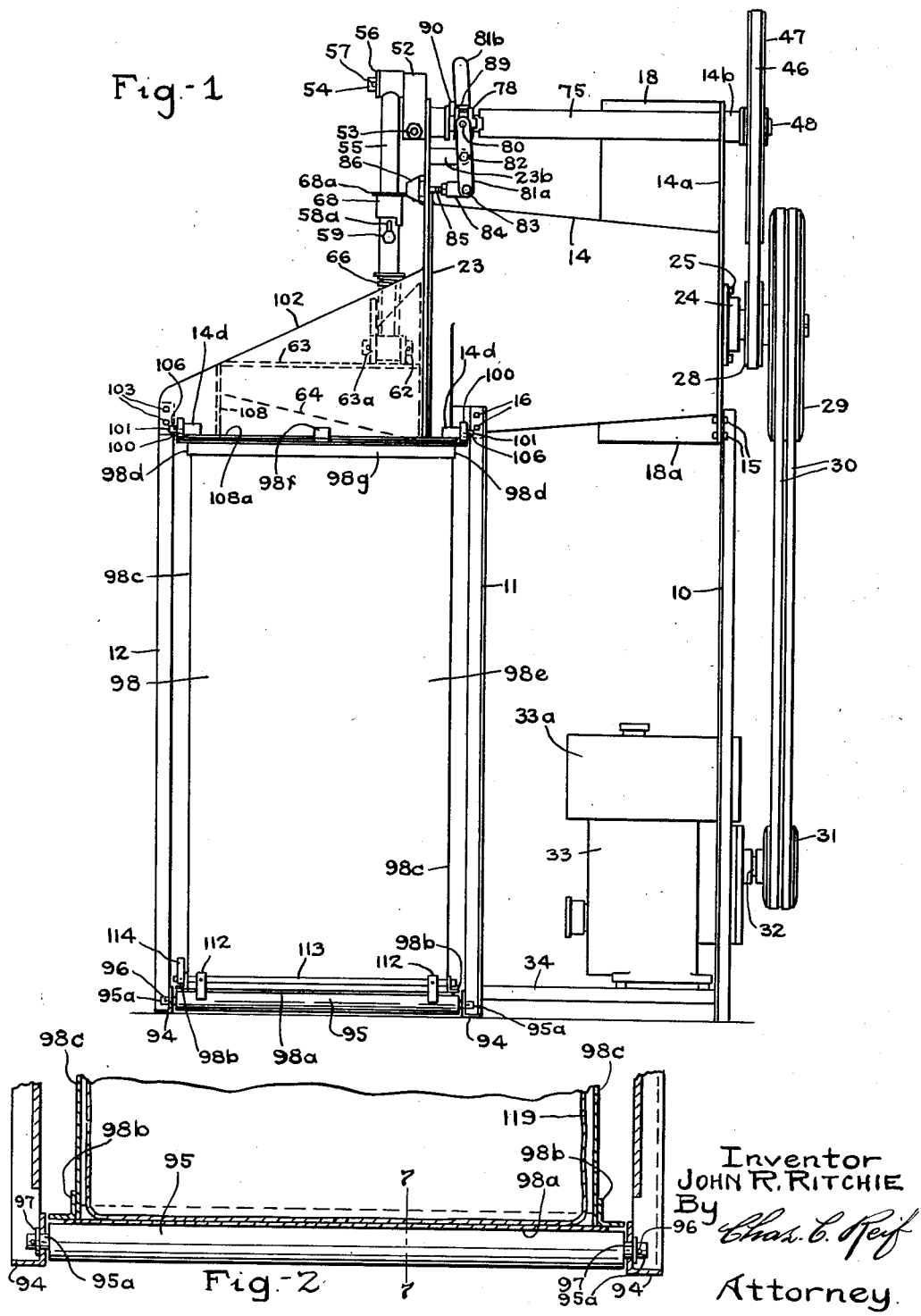
Inventor
JOHN R. RITCHIE
By Chas. C. Reif
Attorney

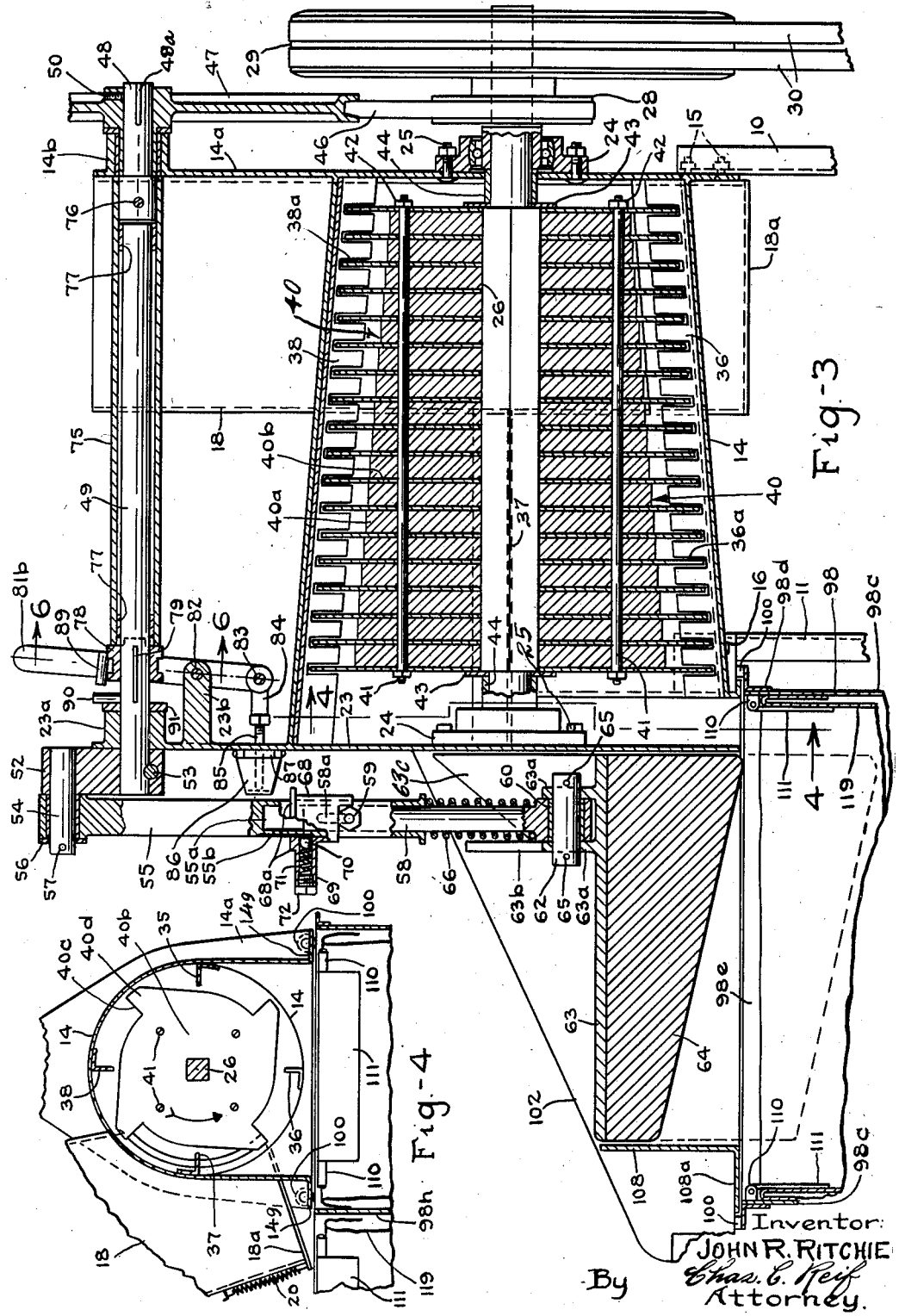

Jan. 30, 1951 J. R. RITCHIE 2,539,635
LEAF BAGGING DEVICE
Filed May 3, 1944 3 Sheets-Sheet 3
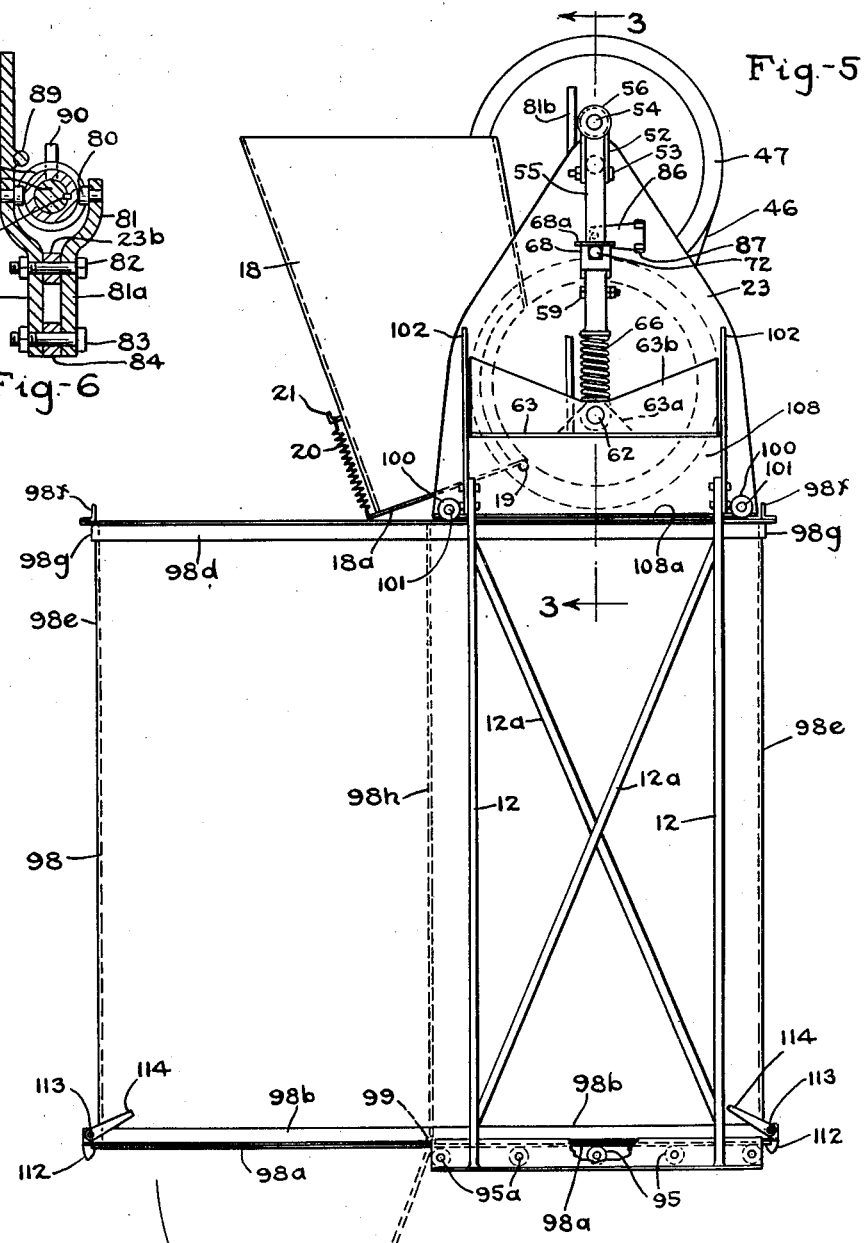
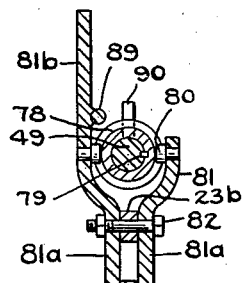
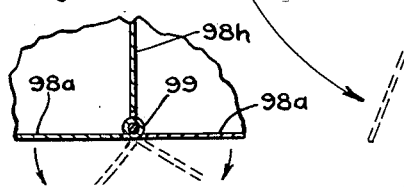
Inventor:
JOHN R. RITCHIE
By *Chas. C. Reif*
Attorney Patented Jan. 30, 1951

2,539,635

UNITED STATES PATENT OFFICE 2,539,635

LEAF BAGGING DEVICE

John R. Ritchie, Minneapolis, Minn.

Application May 3, 1944, Serial No. 534,002

9 Claims. (Cl. 226—61)

This invention relates to a leaf disposal device. As is well known, when the leaves drop in the fall there is quite an accumulation of the same on streets and other places along which trees are located. The bulk of the leaves is large and it is quite a task to collect them and dispose of them.

It is an object of this invention to provide a comparatively simple and efficient device for disposing of fallen leaves.

It is another object of the invention to provide a device for receiving the fallen leaves, reducing them to small pieces and compressing the reduced leaves into receptacles which can be easily handled so that the leaves can be utilized.

It is a further object of the invention to provide a machine for receiving fallen leaves, reducing the same into small pieces, discharging the same to a receptacle and compressing the same in said receptacle.

It is also an object of the invention to provide a machine for receiving leaves and reducing the same to small pieces together with a frame carrying a plurality of removable receptacles, which frame is movable so that one receptacle is brought into position to receive the leaves while another receptacle is brought into position where it can be removed.

It is a further object of the invention to provide a device for disposing of leaves in which the leaves are reduced to small pieces and compressed in a bag such as a paper bag, which bag can be readily removed from the device so that the leaves can be used for fertilizer.

It is still another object of the invention to provide a machine for disposing of leaves comprising a chamber to which the leaves are delivered, means in said chamber for reducing the leaves to small pieces, a receptacle to which said reduced leaves are delivered together with a plunger for compressing the leaves into said receptacle.

It is still further an object of the invention to provide a device as set forth in the preceding paragraph together with means for stopping the operation of said plunger when the receptacle has become substantially full of compressed leaves.

These and other objects and advantages of the invention will be fully set forth in the following description made in connection with the accompanying drawings in which like reference characters refer to similar parts throughout the several views and in which:

Fig. 1 is a view in side elevation of the machine;

Fig. 2 is a partial view in vertical section through a portion of the machine shown on an enlarged scale taken on the same plane as Fig. 3;

Fig. 3 is a vertical section taken substantially on line 3—3 of Fig. 5 as indicated by the arrows;

Fig. 4 is a vertical section taken substantially on line 4—4 of Fig. 3 as indicated by the arrows;

Fig. 5 is a view in front elevation of the machine;

Fig. 6 is a vertical section taken substantially on line 6—6 of Fig. 3 as indicated by the arrows; and Fig. 7 is a partial vertical section taken through the center of the machine substantially on line 7—7 of Fig. 2 shown on an enlarged scale.

Referring to the drawings a machine is shown comprising a frame consisting of spaced pairs of vertical members 10 illustrated as angle bars, a pair of spaced vertical members 11 and a pair of spaced vertical members 12, members 11 and 12 also being illustrated as angle bars. A casing 14 is supported at the upper end of frame members 10 and 11, the same having an end plate 14a to which members 10 are connected by the headed and nutted bolts 15 having heads countersunk into plate 14a. Casing 14 adjacent its other end is connected to frame members 11 by the bolts 16. Casing 14 is shown as frustoconical in form having its smaller end adjacent plate 14a. Said casing is open at its larger end and said larger end at its lower portion is made of substantially rectangular form as shown in Figs. 1, 3 and 4. A hopper 18 is provided disposed at one side of casing 14, said hopper having a bottom plate 18a hinged at one side about hinge pintle 19, said plate being held in closed position by a tensile coiled spring 20 having one end secured to the end of plate 18a and its other end secured to a small bracket or hook 21 secured to the side of said hopper. Said hopper is open at one side as clearly shown in Fig. 4 and communicates with the chamber in casing 14. A plate 23 extends vertically adjacent the larger end of casing 14, the same having secured thereto a bearing member 24. A similar bearing member 24 is secured to the front of plate 14a, said bearings being secured respectively by headed and nutted bolts 25. As shown at the right of Fig. 3, bearings 24 are of the ball bearing type and said bearings support a shaft 26. Shaft 26 has secured thereto adjacent the front bearing 24 a pulley 28. Said shaft 26 also has secured thereto beyond pulley 28 a grooved pulley 29 over which run a pair of belts 30 also running over a grooved pulley 31 secured to the driving shaft 32 of a motor 33 supported upon members 34 extending between frame members 10 and 11. While various types of motors might be used, motor 33 is illustrated as an internal combustion motor having a fuel supply tank 33a. Casing 14 has secured to the inner wall thereof a plurality of members 35, 36, 37 and 38 illustrated as in the form of angle members. Bar 38 which is disposed substantially at the top of casing 14 extends the entire distance between plates 14a and 23, said bar having one flange extending substantially vertically and provided with a plurality of spaced open ended slots 38a. Bar 37 extends substantially halfway of the casing from plate 23 as shown in Fig. 3, and said bar also has a plurality of spaced open ended slots in its inwardly projecting flange, which flange is substantially horizontal. The bars 35 and 36 extend from plate 14a to the larger end of casing 14 and these plates are also provided with a comparatively large number of spaced open ended slots 36a. A rotor 40 is secured to shaft 26, the same comprising a series of spaced cylindrical members 40a having polygonal central openings fitting over shaft 26. In the embodiment of the invention illustrated the portion of shaft 26 carrying said rotor is made square in cross section and fits in the openings in members 40a. Rotor 40 also comprises a series of disks 40b disposed respectively between and at the ends of members 40a. Members 40a increase in diameter toward the larger end of casing 14 so that their peripheries lie substantially in a line parallel to the ends of casing 14. Disks 40b increase in diameter from the small end of casing 14 so that their edges or peripheries lie in a line substantially parallel to the ends of casing 14. Disks 40b are aligned with and arranged to pass through and rotate in the slots of bars 35 to 38. Each disk 40b is cut away at circumferentially spaced portions to form substantially radial edges 40c. These portions form in effect teeth 40d having the radial edges 40c and in the embodiment of the invention illustrated there are four of the teeth 40d on each disk. The disks 40b and members 40a, which latter may be made of wood or similar material, are secured together by a plurality of rods 41 extending therethrough and having threaded ends equipped with nuts 42 which contact the outer sides of the end disks 40b. While the number of rods 41 could be varied, in the embodiment of the invention illustrated they are shown as four in number. Collars or washers 43 engage the outer sides of the end disks 40b and collars 44 extend between the disks 43 and the respective bearings 24. The square portion of shaft 26 extends between disks 43.

A belt 46 runs over pulley 28 and over a grooved pulley 47 secured to one end of a shaft 48 disposed above shaft 26. While pulley 47 could be secured in any suitable way it is illustrated as secured to shaft 48 by a key 48a and a set screw 50. Shaft 48 is journalled in a bearing 14b carried at the top of plate 14a. Shaft 48 has an enlarged portion inwardly of bearing 14b which is secured to a rather long sleeve 75 by a pin 76. A shaft 49 extends from shaft 48 through a bearing 23a carried at the upper end of plate 23. Shaft 49 is also journalled in bushings 77 in sleeve 75 adjacent the ends thereof. Bushings 77 space shaft 49 from said sleeve. The end of sleeve 75 opposite shaft 48 is formed as a half clutch. Said shaft 49 has a crank arm 52 secured to one end thereof in any suitable manner as by a headed and nutted bolt 53. Arm 52 carries a crank pin 54 which extends through a bearing in the upper end of a connecting bar 55. A washer 56 surrounds pin 54 and engages the outer side of bar 55, the same being held in place by a pin 57. Bar 55 has a bore 55a at its lower end in which is received the upper end of a plunger rod 58. Rod 58 has a slot 58a extending longitudinally therethrough for a short distance and a headed and nutted bolt 59 extends through bar 55 and through slot 58a. Plunger rod 58 at its lower end is bored and provided with a bushing 60 in which is carried a pin 62 which also extends through spaced ears or lugs 63a upstanding from a plate 63 to which is secured a plunger head 64. Plunger head 64 is substantially rectangular in horizontal cross section and has a lower surface which slopes upwardly and outwardly at a decided angle from the end of casing 14. Pin 62 is held in place by pins 65 extending therethrough adjacent its ends at the outer sides of ears 63a. A coiled compression spring 66 surrounds the lower portion of rod 58 engaging the enlarged lower end thereof at one end and at its upper end engaging the lower flanged end of bar 55. A sleeve 68 surrounds bar 55 above the nut and head on bolt 59, said sleeve having a recess cut therein at its outer side, the lower edge of which is shown in engagement with the nut on bolt 59 in Fig. 3. Sleeve 68 has a projecting flange 68a at its upper end. A small shell 69 is carried by or secured to sleeve 68 and projects at the outer side thereof, the same having therein a ball 70 engaged by a coiled compression spring 71, the other end of which engages the headed screw 72 which is threaded into the outer end of shell 69. Ball 70 engages the side of bar 55 and preferably moves in a shallow groove 55b formed in the side of said bar.

The end of sleeve 75 adjacent bearing 23a is as stated, formed as a half clutch and adapted to be engaged by a similar half clutch formed on a clutch block 78 slidably mounted on shaft 49 and splined thereto by a key 79. Clutch block 78 is provided with a groove intermediate its ends in which are disposed the heads of pins 80 carried in opposite sides of a clutch fork lever 81 which has arms 81a disposed at opposite sides of a lug 23b projecting from plate 23. Arms 81a are pivoted to lug 23b by a headed and nutted bolt 82. At their lower ends arms 81a are pivotally connected by a headed and nutted bolt 83 to the head 84 into which is threaded a rod 85 in turn engaging one side of a swinging plate 86 hinged at one end by a pintle 87 to the outer side of plate 23. When plate 86 is moved toward plate 23 it moves rod 85 and head 84 and swings clutch fork lever 81 to disengage clutch block 78. One of the arms 81a has an upwardly extending projection 81b forming a handle for the clutch fork lever 81. A pin 89 is secured to one side of handle 81b and is adapted to move into the path of a pin 90 secured to shaft 48 when clutch block 78 is disengaged. A washer 91 surrounds shaft 48 adjacent bearing 23a.

A pair of angle members 94 extend between pairs of frame members 12 and 16 respectively and have horizontal flanges with their bottoms flush with the bottoms of frame members 10 and also have vertical flanges in which are journalled the reduced ends or trunnions 95a of a plurality of rollers 95, said rollers being shown as five in number. See Fig. 5. Rollers 95 are held in place by pins 96 extending through reduced ends 95a thereof closely adjacent washers 97 contacting the angle members 94. Said rollers 95 form the support for a casing 98 which is substantially rectangular in horizontal cross section and has a bottom plate 98a adapted to engage and move on rollers 95. Casing 98 has angle members 98b secured to the lower ends of upwardly extending side members 98c. Plate 98a is formed in two sections each of which is pivoted on a rod 99 supported from angle members 98b. Casing 98 has a central vertically extending partition 98h extending transversely thereof above pintle 99. Frame 98 also has angle members 98d extending along said side plates 98c at its upper ends. Casing 98 has end plates 98e and also has angle members 98g extending transversely between angle members 98d at its upper end. Rollers 100 disposed adjacent each side of plate 23 engage the tops of angle members 98d, said rollers being carried on pins 101 secured in lugs 14d formed at each side of casing 14. A pair of plates 102 disposed in vertical planes, extend from plate 23 outwardly to and are secured to the upper ends of frame members 12 by bolts or rivets 103. The upper ends of plates 102 slope downwardly and outwardly. A triangular plate 63c extends vertically from plate 63, the same having a vertical edge disposed closely adjacent the outer side of plate 23. The angles 98d on both sides of casing 98 are engaged by the lower side rollers 100 which as stated, are carried on pins 101 secured in lugs 14a on flanges 14g on casing 14. Rollers 100 are held on their respective pins by small pins or cotters 106. A plate 108 has a vertical portion disposed adjacent the outer end of plunger 64 and has its sides secured to plates 102, the same having a horizontal flange 108a the bottom of which is disposed adjacent the top of angle members 98d and bars 98g which extend across the ends of casing 98. Small angles 98f are secured to the top and at the ends of bars 98d and act as stops. Plate 63 has a vertically disposed portion 63b which extends upwardly and outwardly from the top of outer lug 63a as shown in Fig. 5.

Casing 98 has projecting inwardly at its upper end small lugs 110 to which are pivoted arms 111 adapted to be swung downwardly to substantially vertical position as shown in Fig. 3. If desired, these arms could be under tension. Arms 111 are adapted to hold the upper ends of bags or receptacles 119 which are shown in Fig. 3 as having their upper ends folded outwardly, said ends being held between the wall of casing 98 and arms 111. Dogs 112 are carried on rods 113 journalled in the vertical flanges of angle members 98b, the same having grooves adapted to engage over the free edges of the swinging bottom plates 98a. Rods 113 can be rotated to bring dogs 112 to engaging or released positions by arms 114 secured to the outer end of rods 113 at the front side of casing 98. There are dogs 112 and arms 114 at each end of casing 98 as shown in Fig. 5.

In operation, the collected leaves will be deposited in the top of hopper 18. While the device may be variously disposed, in practice one disposition contemplated is to have the machine carried on a truck or other vehicle which moves along the street and gathers the leaves. The leaves will be deposited from any suitable means into the top of hopper 18. Should a heavy object such as a stone, brick or piece of iron be collected with the leaves and deposited in the hopper, it will drop down onto bottom plate 18a. The weight of said object will swing said plate downwardly about its hinge pintle 19 against the tension of spring 20 which will be comparatively light and said object will drop out of the hopper. Plate 18a will be returned to position by spring 20. Very few, if any, of the leaves will escape from the hopper. Motor 33 will be operated and pulley 31 thus rotated. This, through the belts 30, will rotate pulley 29 and shaft 26. The disks 40b will be rotated in the direction indicated by the arrow in Fig. 4. The leaves will drop down through the inner side and lower end of the hopper into the chamber in casing 14. These leaves will be engaged by the projecting edges of disks 40b and cut up and reduced to fine pieces by the action of the toothed disks 40b and the bars 35 to 38 inclusive. The leaves will be moved toward the larger end and bottom of casing 14 and will be discharged at the lower portion of said hopper into the receptacle or bag 119. Casing 14 thus forms a chute or means for directing and discharging the leaves into receptacle 119. As described, the casing 98 is movable transversely of the machine on rollers 95. The receptacles 119 which preferably will be of rather heavy or stiff paper, will be disposed in casing 98 at each side of partition 98h. One way of arranging said receptacles is as shown in Fig. 3, where the upper ends thereof are folded outwardly and held between the arms 111 and the wall of casing 98. The bags or receptacles 119 will rest on the bottom plates 98a and will thus be held in vertical or upstanding position with their upper ends wide open. The rotation of shaft 26 rotates pulley 28 and pulley 47 is rotated by belt 46. When the machine is started the operator will push sleeve 68 downwardly and it will be held in its lower position as shown in Fig. 3, due to the friction of ball 70. The operator will also swing clutch fork lever 81 by its handle portion 81b and engage clutch block 78 with sleeve 75 so that shaft 49 will be connected to shaft 48. Rotation of shaft 49 will rotate crank arm 52 and bar 55 will be vertically reciprocated. At each reciprocation bar 55 will press on spring 66 and plunger 64 will be reciprocated with bar 55. As the leaves accumulate in bag or receptacle 119 and reach plunger 64 they will thus be compressed into the said bag or receptacle. When the leaves have accumulated and are compressed so as to offer resistance to plunger 64 spring 66 will be compressed and pressure will be exerted on bolt 59 against sleeve 68. As the resistance to plunger 64 increases due to the leaves being compressed sleeve 68 will gradually be moved upwardly, bolt 59 moving in slot 58a. As sleeve 68 moves upwardly it is held in the position to which it is moved by ball 70. Spring 66 is thus progressively compressed. When the bag becomes substantially full and the leaves are compressed to a certain degree and spring 66 compressed to a certain degree sleeve 68 eventually is moved to its uppermost position and when in this position it comes into alignment with swinging plate 86. There is some sidewise movement to sleeve 68 due to the circular movement of crank pin 54. Sleeve 68 thus moves against plate 86 and moves it to the right as shown in Fig. 3, thus pushing rod 85 and head 84 to the right and swinging the lower end of clutch fork lever 81 to the right. This movement disengages clutch block 78 so that rotation of shaft 49 is terminated. When clutch fork lever 81 is thus moved to the left at its upper end, pin 89 moves into the path of pin 90 and pin 90 which rotates with shaft 49, comes around and strikes pin 89, thus stopping shaft 49 in position with pin 90 extending vertically and crank arm 52 extending vertically. This stops the plunger 64 in its upper position. A bag has thus been filled with compressed leaves. The operator now moves casing 98 to the right as shown in Fig. 5, and the filled bag moves out of alignment with casing 14 and the empty bag which has been placed in casing 98 moves into alignment with casing 14. The movement of casing 98 is stopped by engagement of angles 98f with the sides of casing 14. The filled bag will at this time be released from arm or holders 111 by swinging the latter upwardly. The bag may now be closed and its top sealed or fastened shut in any suitable manner as with a stapling or stitching device. The bag can now be removed from casing 98 by the operator pressing or stepping on one of the arms 114, thus releasing dog 112 and allowing the hinged bottom plate 98a to swing downwardly. The bag will then drop out of casing 98 and can be transferred to the desired position. If desired the bag could be closed or sealed after being removed. Another bag will be placed in casing 98 in the position formerly occupied by the bag which has been filled. When the bag which has been moved into alignment with casing 14 has been filled, casing 98 will again be moved on rollers 95 and the now empty bag will be brought into alignment with casing 14. Before another bag is filled the operator must push sleeve 68 down to its lower position and must reengage clutch block 78 with sleeve 75. Plate 63c cooperating with plate 23, and plate 108 act as guides for plunger 64.

From the above description it will be seen that I have invented a very efficient device for disposing of fallen leaves. The bags or receptacles can be very conveniently and quickly filled with compressed leaves and a practically continuous operation performed. The leaves have considerable value as fertilizer and they can thus be utilized. The reduction of the leaves to small pieces renders them immediately available as fertilizer. Otherwise the leaves have to be piled somewhere and allowed to decay. The leaves are usually more or less dry and most of them are reduced to very fine condition. This reduced or comminuted material can be at once mixed with the soil and is a desirable and valuable soil conditioner and fertilizer. Other uses may be found for such leaves. By compressing the leaves the objectionable bulk thereof is very greatly reduced. This has been one serious objection to the collection and disposal of leaves in the fall season. The bulk of the leaves has been so large that a lot of vehicle equipment was necessary to handle them. With the present device the leaves are reduced to small pieces or comminuted, the bulk reduced to a small fraction of its previous proportion and a valuable product obtained. The leaves can be continuously fed to the machine and the bags of compressed leaves can be readily removed therefrom. It will be apparent that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disposed and defined in the appended claims.

What is claimed is:

1. A leaf disposal device having in combination, a member having an opening extending vertically therethrough, means for supporting a receptacle below said opening into which leaves are discharged, means for compressing said leaves in said receptacle with increasing pressure as said receptacle fills with leaves, means for actuating said means and means for rendering said actuating means inoperative when said receptacle becomes substantially full of compressed leaves and said leaves are compressed to a certain degree.

2. A leaf disposal device having in combination, means for supporting a receptacle having an open upper end adapted to receive leaves, an operating member, means for reciprocating said member including a rotating shaft, means for rotating said shaft a clutch connecting said last mentioned means and shafts, a plunger having a portion slidably connected to said member, a spring between said portion and member, a clutch-operating member, said spring being progressively compressed as said plunger engages said leaves, and means movable when said spring is compressed to a certain degree to move into engagement with said clutch-operating member to operate said clutch and disconnect said third mentioned means and shaft to stop the reciprocation of said first mentioned member.

3. A leaf disposal device having in combination, means for supporting a receptacle having an open upper end adapted to receive comminuted leaves, a vertically movable plunger movable into said open end of said receptacle to compress leaves therein, a vertically reciprocating bar adjacent said plunger, a compressible resilient means between said bar and plunger whereby said plunger is resiliently pressed against said leaves, means for positively reciprocating said bar including a shaft and a clutch for connecting said bar and shaft, a sleeve carried on said bar, means movable by said plunger and by continued compression of said resilient means for moving said sleeve upwardly and a member engaged by said sleeve when in its upward position for operating said clutch and disconnecting said shaft from said bar.

4. The structure set forth in claim 3, and means for holding said sleeve in the position to which it is moved.

5. A leaf disposal device having in combination, means for supporting a receptacle having an open upper end disposed to receive leaves, a plunger movable into said receptacle to compress leaves therein with progressively increasing pressure, a substantially horizontal rotatable shaft, a crank arm on said shaft connected to said plunger for vertically reciprocating the same, a driving shaft, a clutch connecting said driving shaft and first mentioned shaft, means for disengaging said clutch when said leaves have been compressed to a certain degree to stop the operation of said plunger, and means for stopping said crank with said plunger in its uppermost position when said clutch is disengaged.

6. A leaf disposal device having in combination, a frame having an opening through which leaves are discharged, a second frame having side walls and bottom portions, said bottom portions supporting a pair of bags, means for holding the upper ends of said bags in open position, said second frame being movable to bring either of said bags into position below said opening to receive said leaves, means for compressing said leaves in said bags, said bottom portions being respectively movable for discharging said bags.

7. A leaf disposal device having in combination, a frame having spaced vertically extending members surrounding an opening, a reciprocable plunger movable vertically between said members and through said opening, a second frame disposed below said frame surrounding a second opening of greater width than said first mentioned opening so as to extend beyond one side of said plunger, said second frame supporting a receptacle having an open upper end extending about and close to the sides of said second opening, and means for reciprocating said plunger to compress leaves into said receptacle, said plunger having a flat bottom surface disposed in a plane sloping upwardly and away from said side of said receptacle to which said leaves are delivered whereby said leaves will be moved toward the opposite side of said receptacle.

8. A leaf disposal device having in combination, a frame extending about an opening, a second frame having side walls and downwardly swinging bottom portions upon which bottom portions a pair of receptacles are supported, one of said receptacles being disposed below said opening, means for holding said bottom portions in bag supporting position, means for discharging comminuted leaves through said opening and into said one receptacle, means for holding the tops of said receptacles in open position, said second frame being movable to bring said other receptacle below said opening into leaf receiving position and said first mentioned receptacle into removable position, means movable through said opening for compressing leaves in said one receptacle, said first mentioned means being movable to permit said portions to swing downwardly respectively to discharge said receptacles when filled.

9. A leaf disposal device having in combination, a receptacle having an open upper end adapted to receive leaves, a plunger movable into said receptacle to compress the leaves therein, a vertically reciprocating bar, a compressible resilient means between said bar and plunger whereby said plunger is yieldingly moved by said bar, means for positively reciprocating said bar, a member carried on said bar and movable thereon by said resilient means as the resistance of said leaves to said plunger increases and as the compression of said resilient means increases, and means actuated by said member when sufficiently moved to render inoperative said last mentioned means.

JOHN R. RITCHIE.

REFERENCES CITED

The following references are of record in the file of this patent:

UNITED STATES PATENTS

| Number | Name | Date |
| --- | --- | --- |
| 431,638 | Zimmerman et al. | July 8, 1890 |
| 458,327 | Lipe | Aug. 25, 1891 |
| 831,170 | Lupton | Sept. 18, 1906 |
| 1,003,006 | Maxwell | Sept. 12, 1911 |
| 1,083,765 | Smith | Jan. 6, 1914 |
| 1,734,166 | Hausen | Nov. 5, 1929 |
| 1,847,543 | Warming | Mar. 1, 1932 |
| 1,898,243 | Coble et al. | Feb. 21, 1933 |
| 2,141,662 | Ossing et al. | Dec. 27, 1938 |
| 2,157,619 | McElwain | May 9, 1939 |
| 2,242,557 | Urschel et al. | May 20, 1941 |
| 2,269,722 | Laskso | June 13, 1942 |
| 2,290,812 | Normal | July 21, 1942 |
| 2,379,230 | Griffin | June 26, 1945 |